United States Patent [19]

Arzouman

[11] E Patent Number: Re. 32,715

[45] Reissued Date of Patent: Jul. 19, 1988

[54] APPARATUS FOR JACKING UP AND SUPPORTING A STRUCTURE

[75] Inventor: Harry H. Arzouman, Corona del Mar, Calif.

[73] Assignee: Safe-T-Jack, Inc., Irvine, Calif.

[21] Appl. No.: 890,930

[22] Filed: Jul. 28, 1986

Related U.S. Patent Documents

Reissue of:

[64] Patent No.: 4,462,569
Issued: Jul. 31, 1984
Appl. No.: 261,686
Filed: May 7, 1981

[51] Int. Cl. ..... B66F 5/04

[52] U.S. Cl. ..... 254/8 B; 254/84 R

[58] Field of Search ..... 254/133 R, 134, 8 B, 254/8 R, 89 R, 1; 248/354 P, 354 S; 414/427

[56] References Cited

U.S. PATENT DOCUMENTS

| | | | |
|---|---|---|---|
| 1,481,445 | 1/1924 | Swanson . | |
| 1,505,443 | 8/1924 | Stone | 254/134 |
| 1,750,663 | 3/1930 | Dart | 254/133 R |
| 3,834,669 | 9/1974 | Reid | 254/133 R |
| 3,850,419 | 11/1974 | Craig | 254/134 |
| 4,066,243 | 1/1978 | Johnson | 254/133 R |
| 4,113,234 | 9/1978 | Wride . | |
| 4,123,038 | 10/1978 | Meyers | 414/427 |
| 4,177,978 | 12/1979 | Warsaw | 254/134 |
| 4,289,298 | 9/1981 | Kameda | 254/8 B |

*Primary Examiner*—Robert C. Watson
*Attorney, Agent, or Firm*—Gene W. Arant; Matthew F. Jodziewicz

EXEMPLARY CLAIM

A jacking system includes a wheeled hydraulic power unit having an operating handle, and at least two extendable jack units which are identical.

Each jack unit is adapted to rest upon the ground, and the power unit can be wheeled into (or out of) engagement with the jack unit. When engaged with a jack unit, the power unit is capable of extending (or raising) the jack unit; a ratchet on the jack unit then locks it in its extended position. A manual control on the power unit is coupled to the jack unit (when the two units are interengaged) for releasing the ratchet, so that the power unit can then lower the jack stand to its retracted position.

57 Claims, 4 Drawing Sheets

4
4
V
JU
G 200
201
210
V
40
42
31
155a
33
30
157
155
32
153
152
PU
150
154
JU
20
120
10
151
110
100
130
131
132
133
H
160
161

APPARATUS FOR JACKING UP AND SUPPORTING A STRUCTURE

Matter enclosed in heavy brackets [ ] appears in the original patent but forms no part of this reissue specification; matter printed in italics indicates the additions made by reissue.

BACKGROUND OF THE INVENTION

The previously known methods of jacking up and supporting a vehicle or structure have left much to be desired.

For example, in order to work underneath an automobile it is often necessary to raise the vehicle and support it at two or more separate points. Previously known methods of accomplishing this result have generally been dangerous and unsafe, since there would be at least one point of time at which the person doing the work would have to place a portion of his body underneath the vehicle even though the vehicle was not firmly and safely supported.

The object and purpose of the present invention is to provide a method and apparatus for jacking up and supporting a vehicle or structure, which will substantially eliminate the safety hazards inherent in previously known methods and apparatus.

PRIOR ART

Prior art references known to the applicant include the following:

| | | |
|---|---|---|
| No. | 949,331 | Scholle |
| No. | 2,258,825 | Thompson |
| No. | 2,404,577 | Jackson |
| No. | 3,664,635 | Kincaid |
| | 829,333 | HAMPSON |
| | 1,280,472 | HOPKINS |
| | 1,280,473 | HOPKINS |
| | 1,863,105 | GARNIER |
| | 2,370,681 | MUELLER |
| | 2,529,292 | GREENFIELD |
| | 3,834,669 | REID |
| | 4,251,056 | MANIGLIA |

SUMMARY OF THE INVENTION

According to the present invention a two-part system of apparatus is used for jacking up and supporting a vehicle or structure. The apparatus includes a single machine known as the power unit or jack, and a number of identical devices each of which constitutes an extendible jack stand.

Each of the extendible jacks stands is ordinarily in an initial condition in which its members are telescoped or retracted. It is capable, however, of being vertically extended for the purpose of raising a load. When thus extended, it is also capable of being locked in that position.

According to the invention the power unit or jack is so designed and arranged as to be capable of positioning an extendible jack stand in a desired location, and also of controlling the operation of that jack stand after it has been positioned. More specifically, the power unit is capable of handling and controlling the jack stand in such a way that it is not necessary for human hands to be placed directly upon the jack stand.

The method of the invention is carried out as follows. The power unit is utilized in order to place a plurality of the jack stands in selected locations underneath the vehicle or structure that is to be raised. The power unit is then utilized to control the jack stands one at a time, so that each jack stand is vertically extended and then locked in its extended position. In this manner the entire vehicle or structure is raised without the necessity of placing human hands, or any portion of the bodies of operating personnel, underneath the vehicle or structure. When the vehicle or structure is to be lowered, the power unit is again utilized for controlling the jack stands one at a time, in such manner that each jack stand is first unlocked and then retracted to its initial condition.

In accordance with the invention the presently preferred form of jack stand includes horizontal top and bottom plates, a pair of vertically disposed telescoping members attached to corresponding ones of the plates, and ratchet means carried by the telescoping members for releasably locking them in a selected position of longitudinal extension.

According to the presently preferred form of the invention the power unit includes a frame having wheel support means, and which is adapted to be selectively moved towards or away from the vicinity of a jack stand. The power unit is provided with expansible lifting means adapted to be inserted between the plates of the jack stand. The power unit also includes power means for expanding the expansible lifting means so as to thereby raise the top plate of the jack stand. The power unit also includes a manually operated control for the power means, and a manually operated control for releasing the ratchet means of the jack stand.

To ensure effective cooperative action of the power unit with the jack stand, it is also preferred to equip both units with alignment means so that the power unit may be moved into engagement with the jack stand in a predetermined relative position. Since the ratchet is in the jack stand, while the ratchet release is a manual control carried by the power unit, it is also necessary to provide an appropriate coupling from the ratchet release control to the ratchet mechanism itself. This ratchet release coupling mechanism is preferably located directly in conjunction with the alignment mechanisms of both the power unit and the jack stand.

DRAWING SUMMARY

DETAILED DESCRIPTION--GENERAL OPERATION

Figure 1:
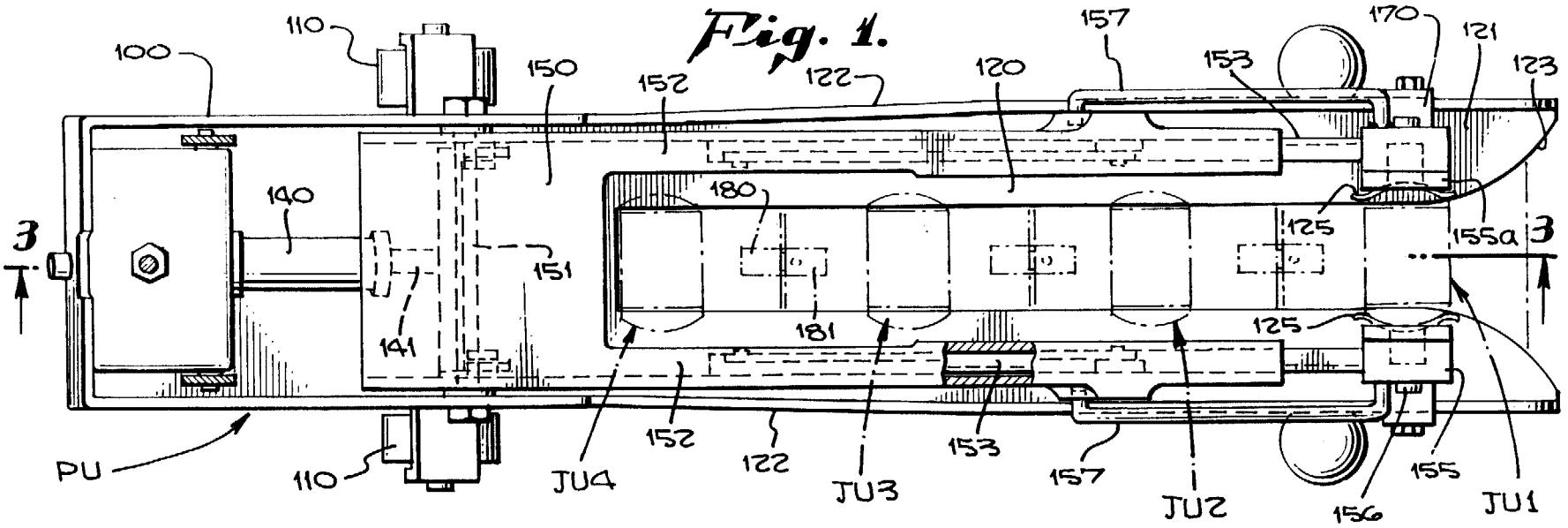
FIG. 1 is a top plan view of the presently preferred form of power unit or jack in accordance with the invention.

FIGS. 1-9, inclusive, of the drawings illustrate the presently preferred form of apparatus in accordance with the present invention. In general, the apparatus includes a single power unit PU and a plurality of jack stand units JU. FIG. 1 shows a top plan view of the power unit PU and also shows in dotted lines a set of four jack stand units JU1, JU2, JU3, and JU4 which are so positioned as be transported by the power unit. Elsewhere in the drawings (with the exception of FIG. 3) only a single jack stand unit is shown; therefore, in the other drawing figures the jack stand unit is simply referred to by its general designation, JU.

The operation of the apparatus is such that the power unit PU could be considered the "master" while the jack unit JU could be considered the "slave". That is, the hands of the operator are directly applied only to the power unit, and the power unit is capable of transporting, positioning, raising, locking, unlocking, lowering, and withdrawing the jack stand unit. More importantly, all of these operations are accomplished without the necessity for the human operator to place any part of his anatomy underneath the vehicle or structure which is going to be raised and supported by the jack stand units.

The power unit therefore has several manual controls, all of which are positioned at its rearward end and conveniently available to the operator. At its forward end it has mechanism for aligning it in a predetermined position relative to the jack stand unit, and also for latching it in that position. Also at its forward end it has expansible lifting means for raising or lowering the jack stand.

The power unit is also designed and arranged in such manner that it becomes a vehicle for transporting a jack stand unit to or from a desired location. Further, in its presently preferred form the power unit has a capacity for transporting four of the units JU simultaneously.

JACK STAND UNIT

(FIGS. 3-9)

In general, the jack stand unit JU includes a flat horizontal base plate 10, a vertical frame 20 whose lower end is rigidly attached to the base plate, a vertical shaft 30 which is arranged in telescoping relationship with the frame 20, and a horizontal top plate 40 which is rigidly attached to the upper end of the shaft 30. Top plate 40 provides a load-bearing seat. All of the parts are made of a metal such as steel, and the telescoping members are preferably attached to the corresponding plates by means of welding. Both the vertical frame 20 and the vertical shaft 30 are made of hollow configuration, for greater structural advantage. Base plate 10 is simply a flat metal plate of square or rectangular configuration adapted to rest upon the ground G or other supporting surface, providing a supporting base for the jack stand unit.

Figures 3, 7, 8:
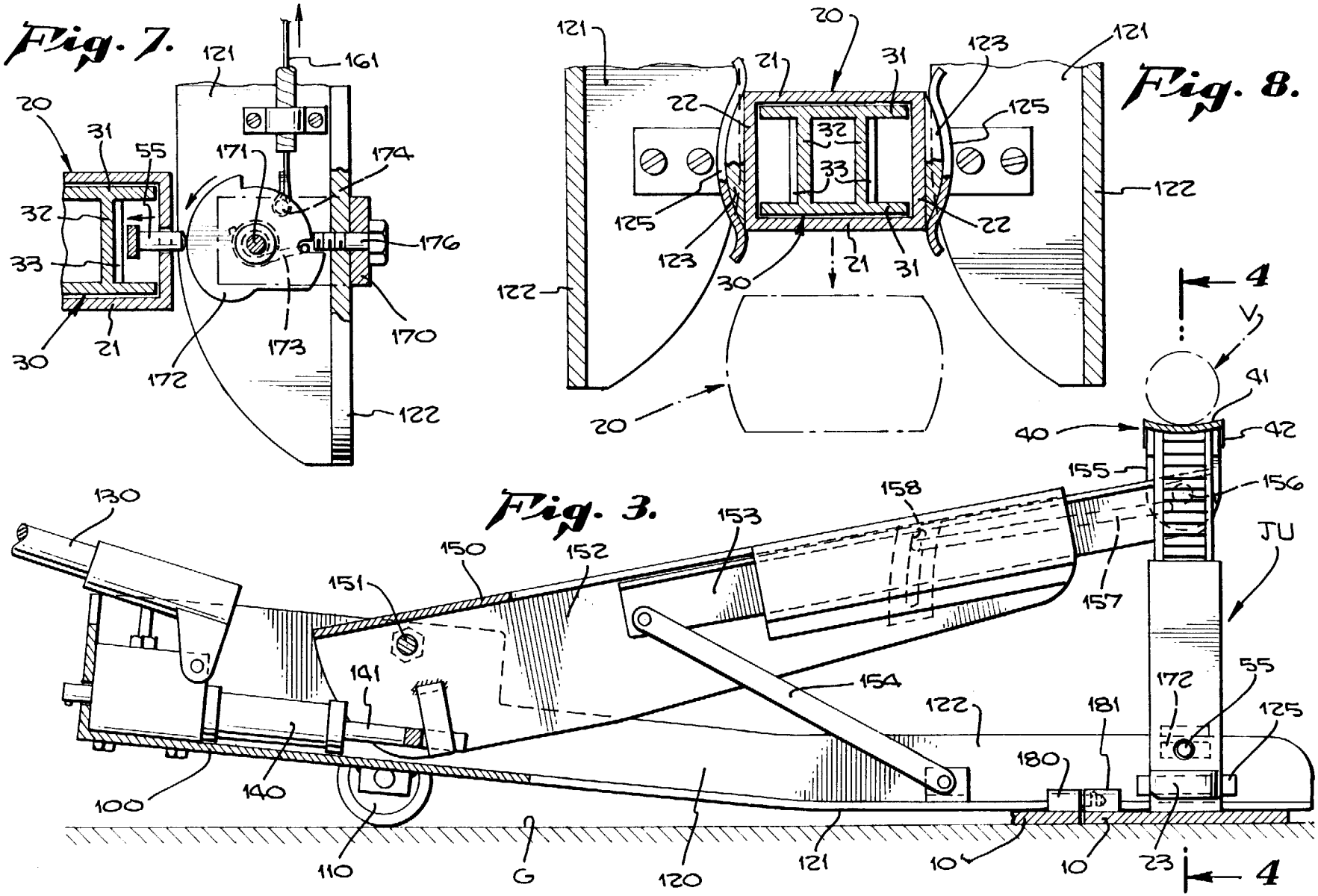
FIG. 3 is a side elevation view of the power unit and one of the jack stands when in their interengaged position, with the jack stand being vertically extended.
FIG. 7 is a view similar to the right-hand side of FIG. 5, showing the action that occurs when the ratchet mechanism is being released.
FIG. 8 is a cross sectional view taken on line 8—8 of FIG. 4, and showing the alignment mechanisms of both units of the apparatus.
Figure 5:
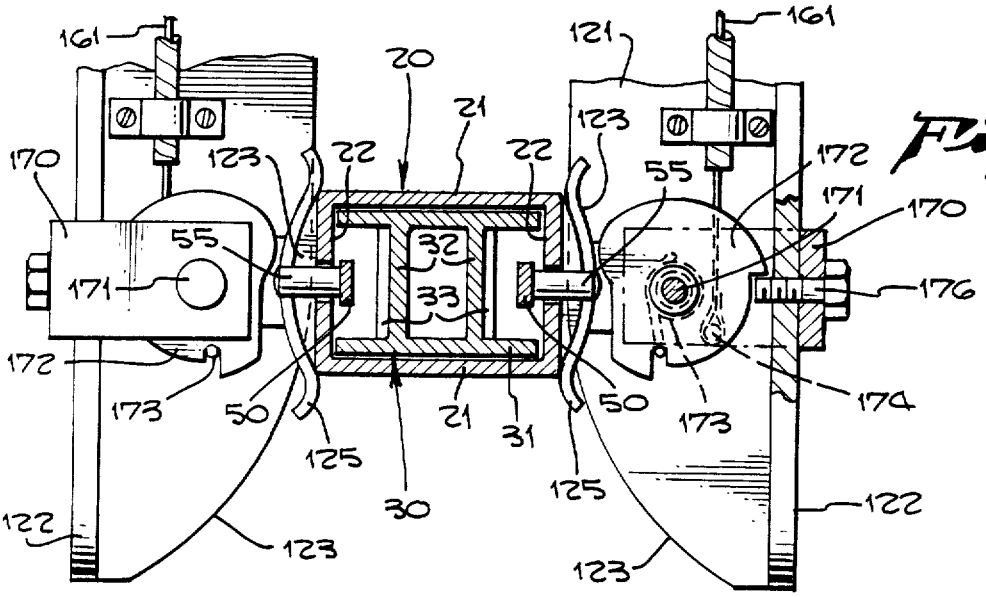
FIG. 5 is a horizontal cross sectional view of the mechanism taken on the line 5—5 of FIG. 4.

Frame 20 is of hollow rectangular configuration as best seen in FIGS. 5 and 8. It has identical front or back walls 21 and identical side walls 22. A rounded protuberance 23 is welded onto the outer surface of each side wall 22 near its lower end, but spaced a certain distance above the base plate 10. Protuberances 23 are used for aligning and latching the power unit PU to the jack stand unit JU, as will later be described. A small distance above the protuberance 23 each of the side walls 22 also has a hole or opening 24 to receive a ratchet release pin, as will be later described.

The shaft 30 includes a pair of identical front or back plates 31. It also includes a pair of identical ratchet plates 32 which provide a web structure that interconnects the plates 31, in an arrangement similar to an I beam, except that the plates 32 are spaced apart a distance which is about equal to the distance by which they are set inward from the ends of the plates 31. The outer surfaces of the ratchet plates 32 carry ratchet teeth 33. The shaft assembly 30 is of such a size as to fit inside the hollow frame 20, as clearly shown in FIGS. 5 and 8. The outer surfaces of the front or back plates 31 of shaft 30 then bear against the inner surfaces of front or back walls 21 of frame 20. The lateral edges of plates 31 are fitted fairly closely to the inner surfaces of side walls 22 of the frame 20. The fit of shaft 30 inside the hollow frame 20 is sufficiently loose as to keep friction within reasonable limits, but at the same time tight enough to ensure a moderately accurate vertical alignment of the shaft 30.

Top plate 40 includes a load-bearing member 41 which is secured to the upper ends of plates 31, 32, and whose lateral expanse is sufficient to overhang the side walls 22 of frame 20. The outer ends of load-bearing member 41 are fitted with downwardly depending vertical flanges 42. The load-bearing member 41 is in the general form of a flat plate, but its upper surface has a slight concave curvature, as most clearly seen in FIG. 3, in order to most advantageously support a load such as a vehicle shaft V.

A pair of ratchet arms 50 are positioned inside the side walls 22 of frame 20 and extend from the pin openings 24 upward to somewhat near the top of frame 20. Each of the ratchet arms 50 has a curved plate or tooth 51 welded to its upper end. Near the upper end of each arm 50 a pivot pin 52 pivotally supports it from a bracket 53 that is in turn welded to the interior surface of side wall 22. A ratchet spring 54, located above the bracket 53, is positioned between side wall 22 and ratchet tooth 51 for purpose of urging the tooth 51 into engagement with one of the ratchet teeth 33 carried by ratchet plate 32 of the shaft assembly 30. A ratchet release pin 55 extends horizontally through each of the openings 24, see FIGS. 4 and 5, with its inner end being welded to the lower end of ratchet rod 50. The upper edges of the two ratchet plates 51 are at the same elevation, and ratchet teeth 32 are arranged in pairs so that the ratchet mechanism provides vertical support for both of the plates 32 in each vertical position that corresponds to a pair of the ratchet teeth 32. The ratchet mechanism provides a self-latching means for locking the vertically telescoping frame members in a selected extension position.

The design of unit JU lends itself to the insertion of a pair of lifting jaws underneath the laterally projecting ends of the load-bearing member 41, so that the jaws will be laterally retained by the flanges 42. As the load-bearing member 41 is moved upward, the shaft assembly 30 moves with it, and downward movement is constrained by the ratchet mechanism. The ratchet mechanism can be released by pressing both of the ratchet release pins 55 inwardly at the same time. This action serves to release both of the ratchet plates 51 from engagement with the ratchet teeth, thereby permitting the upper portion of the unit JU, i.e., shaft assembly 30 and top plate 40, to drop downwardly.

POWER UNIT

(FIGS. 1–9)

Figures 9, 10:
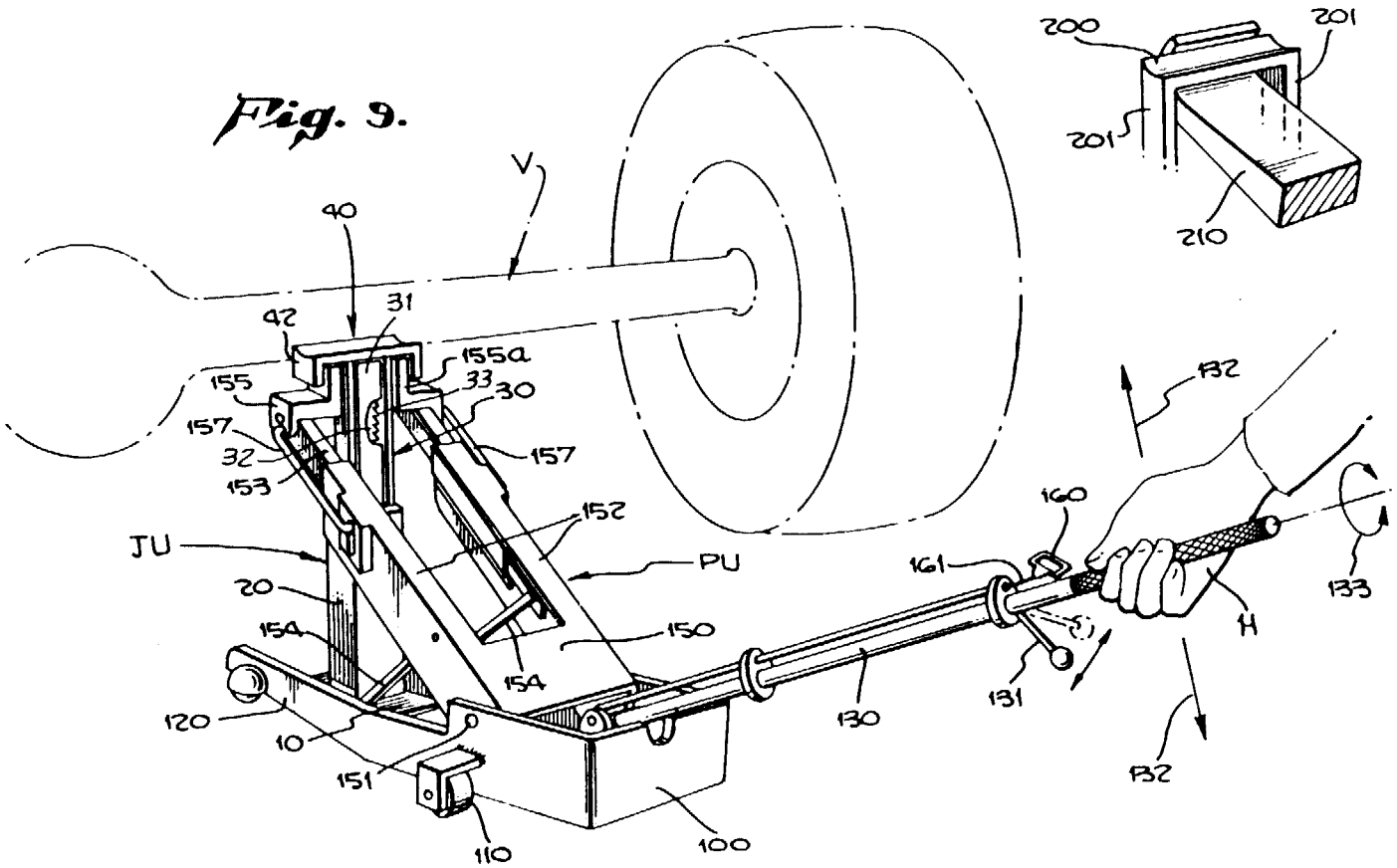
FIG. 9 is a perspective view showing the apparatus of the present invention being used for raising the axle of a vehicle.
FIG. 10 is a perspective view of a modified form of the jack and lifting means.

Power unit or jack PU has a generally box-like frame 100 which is best seen in FIG. 9 in conjunction with FIGS. 1 and 3. The frame 100 is supported on a pair of wheels 110 which are attached to its respective sides. A pair of frame extensions 120 extend forward from the respective sides of the frame 100, providing a generally U-shaped configuration in the horizontal plane, as best seen in FIG. 1. The forward end portions of the frame extension 120 provide latching arms that are particularly adapted to be aligned with, and latched to, the jack stand unit JU.

Figure 4:
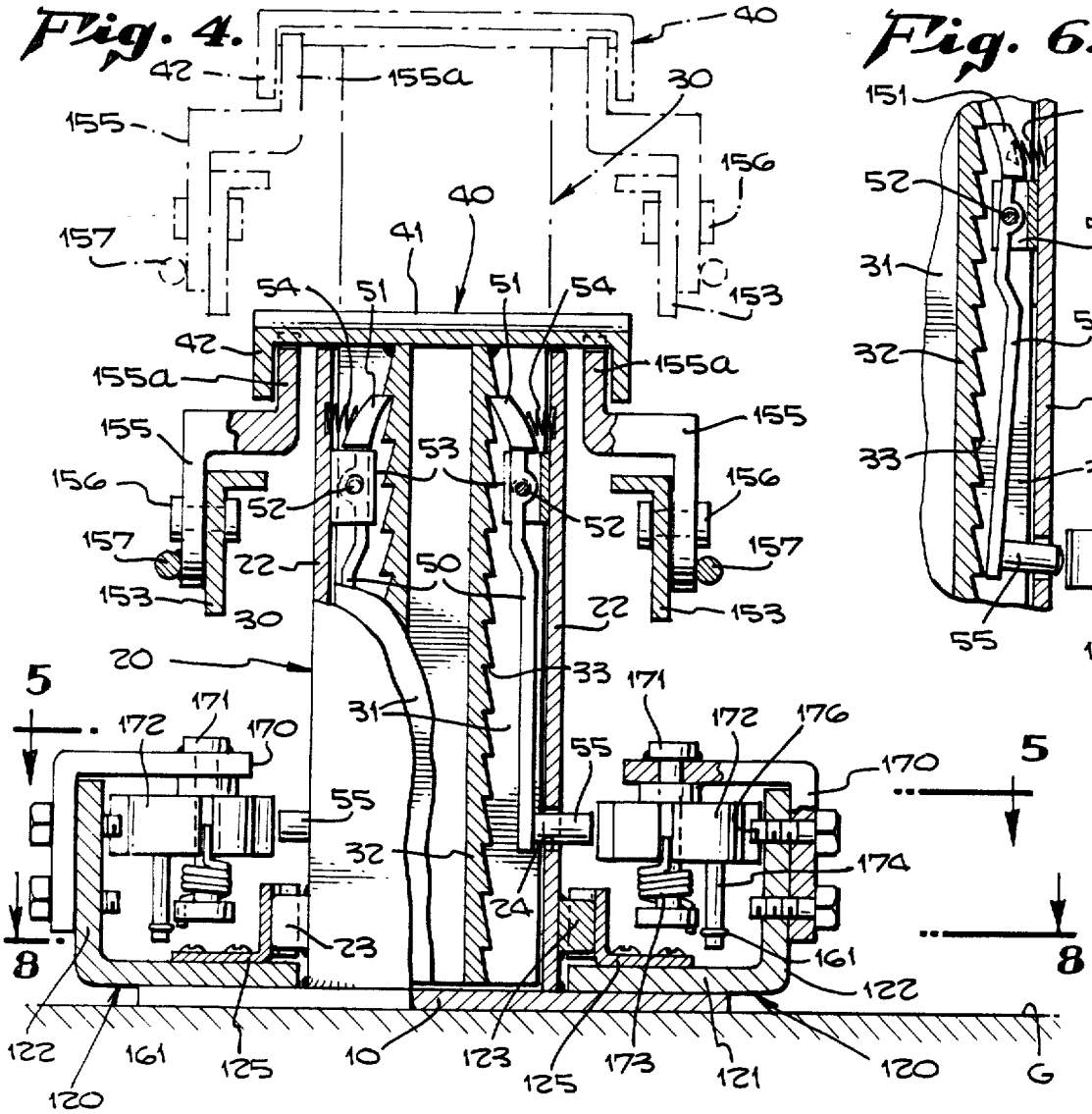
FIG. 4 is a transverse cross sectional view of the jack stand taken on the line 4—4 of FIG. 3, and also showing the interengaging parts of the power unit.

Thus as seen in FIGS. 4 and 5 each of the frame extensions has an L-shaped configuration in the vertical plane, including a horizontal bottom plate 121 and a vertical outer or side plate 122. The vertical thickness of bottom plate 121 is such that it will slide upon the top surface of base plate 10 of unit JU and yet fit beneath the protuberance 23. In this connection it will be noted that, as best seen in FIG. 3, the frame extensions 120 are curved in a somewhat banana-shaped configuration, so that while the rear or main frame 100 is supported a substantial distance above ground G by means of wheels 110, the bottom plates 121 at the forward ends of the frame extensions 120 are substantially horizontal at the elevation of the vertical gap between bottom plate 10 and protrusion 23 of unit JU.

The forward extremity of each bottom plate 121 is convexly curved at 123, as best seen in FIG. 5. These curved forward ends of the bottom plates provide an automatic centering action when the power unit PU is propelled into engagement with one of the units JU. At the point where curved extremity 123 ends, each of the bottom plates 121 has a vertically disposed spring 125 welded to its upper surface. Spring 125 is curved in the horizontal plane, as best seen in FIG. 5, and is so arranged as to capture the corresponding protuberance 23 in retaining relationship therewith.

For purpose of propelling and controlling the power unit PU, it is equipped with a handle 130 which extends rearwardly and upwardly from the main frame 100. See FIGS. 3 and 9. Handle 130 has three different modes of operation. In one mode a switch 131, see FIG. 9, is moved into its locked position so that handle 130 is locked in fixed relationship to frame 100. This condition permits the power unit PU to be easily transported from one place to another, since the operator simply pushes the handle 130 downward by a sufficient amount so that the latch arms 121, 122 will easily clear the ground and other obstructions. The handle is also kept in the locked position when the power unit is being brought into engagement with a jack stand unit JU. After the springs 125 have become latched around protuberances 23 of the unit JU, the lock 130 is moved to its unlocked position.

When the handle is unlocked, it can be moved vertically in a pivoting movement, and it can also be rotated. In either of these movements it is powered by the hand H of the operator, see FIG. 9. Vertical arrows 132 indicate the vertical pivoting movement of the handle 130, while circular arrow 133 indicates the rotating movement. The vertical movement is used for pumping up, or supplying energy to, a hydraulic cylinder 140 carried within the main frame 100 of the power unit. Rotating movement of handle 130 is effective for actuating a release valve, not specifically shown, so that the pressure generated by cylinder 140 will be relieved. The mode of operation of both the hydraulic cylinder 140 and the actuating handle 130 are generally conventional and well understood, and hence need not be further described.

Power unit PU also includes a lifting frame 150, of generally box-like configuration, which is supported within the main frame 100 by means of pivot shaft 151. See FIGS. 3 and 9. The lifting frame 150 has two side extensions 152, each providing a lifting arm, and thus giving the lifting frame a generally U-shaped configuration when seen in the horizontal plane, as in FIG. 1.

The lifting frame 150 is pivoted in a vertical plane so as to raise the lifting arms 152, this action being accomplished by the forward movement of piston rod 141 driven forward by expansion within the cylinder 140, the piston rod 141 being secured to the lifting frame 150 at quite some distance below the pivot shaft 151. The lifting arms 152 carry corresponding lifting arms extensions 153, best seen in FIG. 3. Each lifting arm extension 153 is slidably mounted in the corresponding lifting arm 152 for longitudinal extension thereof. A tie rod 154 has its ends connected by pivot pins to the rearward end of the lifting arm extension 153, and also to a properly selected point on the side wall 122 of the corresponding latch arm, so that as the lifting arm is raised its arm extension will move progressively forward. The purpose of this arrangement is so that a jaw 155 carried on the forward end of lifting arm extension 153 will at all times remain vertically aligned above the base of the jack stand.

Figure 2:
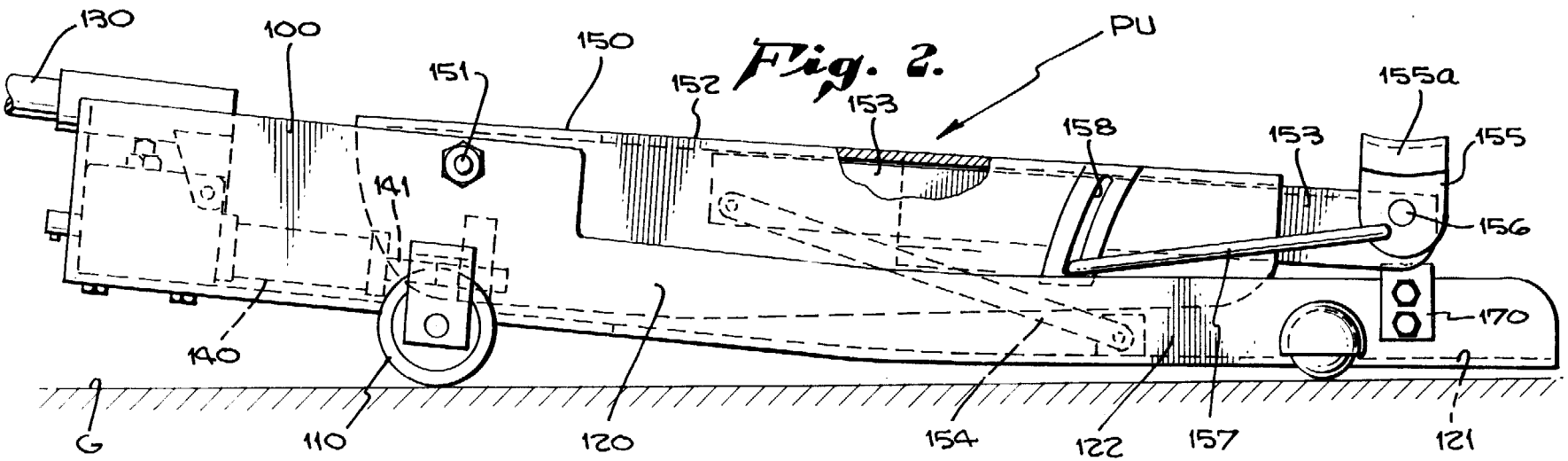
FIG. 2 is a side elevation view of the power unit of FIG. 1.

Thus the lifting arm extension serves to correct the length of the associated lifting arm as a function of the angularity through which the arm is pivoted. It is also necessary to progressively correct the angular position of the jaw 155. Thus the jaw 155 is supported by means of a pivot pin 156 from the end of arm extension 153, and an alignment rod 157 has its forward end welded to the jaw 155 while its rearward end rides in a curved slot 158 formed in the associated lifting arm 152. The forward relative movement of arm extension 153, in conjunction with the curvature of slot 158 as best seen in FIG. 2, causes jaw 155 to progressively change its angular relationship to the arm extension as the arm extension is being extended. The action is therefore such as to maintain a constant angular position of jaw 155 relative to ground as the load-bearing member 41 is elevated. This is illustrated in FIG. 3. It will be noted that the upper surface of jaw 155 is concavely curved so as to engage the convexly curved under surface of load-bearing member 41, thereby ensuring both effective alignment and effective support.

RAISING THE JACK STAND

In order to raise the jack stand the power unit PU must be brought into alignment with the jack stand unit JU. With handle 130 in its locked position, the operator directs the power unit so that the bottom plates 121 of latch arms 120 will slide upon the upper surfaces of plate 10 on opposing sides of the frame 20. Curved surfaces 123 cause the power unit to be automatically centered in a lateral direction, and springs 125 engage the protuberances 23 with a moderately strong latching action so as to establish the correct longitudinal or forward position of the power unit. When this is accomplished, the jaws 155 are automatically located underneath the projecting ends of load-bearing member 41 and within the confines of the flanges 42 thereon. It will be noted in FIG. 4 that the jaws 155 have inwardly offset portions 155a which fit within the flanges 42.

The operator now unlocks handle 130 by actuating the latch 131, and commences a vertical pumping action. Energy accumulated within the cylinder 140 then drives the piston rod 141 in a forward direction so as to pivotally raise the lifting arms 152, together with their forward extensions and associated jaws and adjustment mechanisms. The load-bearing member 41, together with the load that it carries, is lifted to whatever height is desired. When the raising of the jack is completed the handle 131 is rotated in a slow and cautious manner so as to partially relieve the lifting force of the jaws 155, thereby ensuring that the nearest pair of the ratchet teeth 33 will reliably seat upon the ratchet plates 51. The cylinder pressure is then further relieved, and the power unit may if desired be withdrawn from its engagement with the jack stand unit so as to be used at another location.

LOWERING THE JACK STAND

In order to lower the jack stand the power unit must be brought into its engagement position, and the lifting arms raised so that the jaws 155 carry the full load of the load-bearing member 41. At that time a remote control 160 carried on handle 130 of the power unit is actuated for purpose of releasing the ratchet mechanisms in the jack stand. Remote control device 160 consists simply of a cord or cable with a handle on its rearward end. Inside the frame 100 of the power unit the cord 160 is divided into a pair of cords 161 which run along the upper surfaces of bottom plates 121 of the corresponding latch arms of the power unit. Each cord 161 is capable of operating a cam mechanism that will, in turn, push the associated ratchet release pin 55 inwardly of the side wall 22 of frame 20 of the jack stand unit.

The cam mechanism will now be described. A bracket 170 is attached to outer side wall 122 of the latch arm, extending inward from the upper edge of that side wall. A fixed vertical bolt or pin 171 extends downward from the bracket 170. A rotatable cam 172 is carried on the bolt or pin 171, cam 172 being in the same horizontal plane as the associated ratchet release pin 55, as best seen in FIG. 4. A coil spring 173 interacting between the bolt or pin 171 and the cam 172 serves to normally retain the cam in a non-actuated position. The limit position of the cam is established by screw 176 in side wall 122. The corresponding cord 161 is tied to an arm 174 which projects downward from the underside of cam member 172. The non-actuated position of the cam members 172 is shown in FIGS. 4 and 5. FIG. 7 shows the actuated position in which the cords 161 have been pulled, thereby causing the cam member 172 to push the release pin 55 inwardly of frame 20. Thus the hole 24 and release pin 55 provide a means for disabling the self-latching action of the ratchet mechanism.

Figure 6:
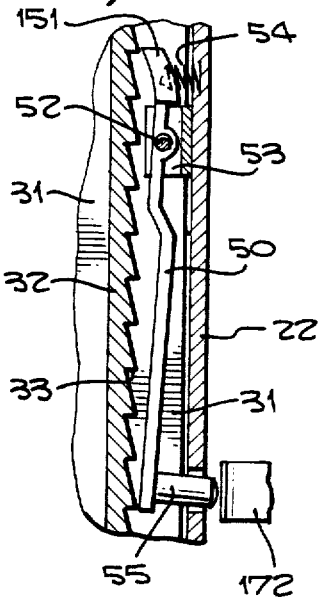
FIG. 6 is a fragmentary cross sectional view of the ratchet mechanism of the jack stand, showing its released position.

FIG. 6 shows the releasing action of the ratchet mechanisms. Since both pins 55 are pushed inward at the same time, both ratchet plates 51 will release at the same time, or nearly so. Precise synchronization of the release of the two sides of the ratchet mechanism is not required since the load on the load-bearing member 41 remains fully supported by the lifting arms until the ratchet release operation is fully completed.

It is necessary for the operator to continue pulling on cord 160 while the upper portion of the jack stand is being lowered. Otherwise the load would be locked in place by the very next pair of ratchet teeth 33.

TRANSPORTING MULTIPLE JACK STANDS

As indicated in FIG. 1, the power unit PU is capable of transporting four of the jack stands JU. They are carried on the blades 121 of the latching arms of the power unit, with the two protuberances 23 of each jack stand unit resting on the upper surface of those blades. FIG. 3 shows a jack stand JU which has been positioned and is in the course of being vertically extended. It has a flat base plate 10. The base plate 10' of the next jack stand of the series is shown in fragmentary form. Mating snap fastener elements 180, 181 are secured to the upper surfaces of the plates 10', 10, at their forward and rearward edges, respectively. When two or more jack stands are being transported by the power unit, these snap fasteners keep them connected together in a series.

When the first jack stand JU is installed and raised with a load on it, withdrawal of the power unit will not result in moving the jack stand. Rather, the springs 125 will slide away from the protuberances 23 of the first jack stand, and will later engage the protuberances 23 of the second jack stand. Continued withdrawal of the power unit will cause the snap fastener 180, 181 to separate, since a relatively small force is required for that purpose. Thus, for the next installation of a jack stand, the second jack stand JU2 of the original series is already properly positioned in the power unit.

ALTERNATE FORMS

While in the presently preferred embodiment the power unit PU carries a single hydraulic cylinder 140 to provide the power operation, other arrangements are of course possible. For example, a pair of vertically aligned cylinders carried by the power unit may be inserted between the top plate 40 and bottom plate 10 of the jack stand unit JU and expanded vertically for the purpose of lifting the load.

An alternate type of arrangement is shown in FIG. 10. There a load-bearing seat 200 has its respective ends fastened to the upper ends of a horizontally spaced pair of vertical shafts 201. The vertical shafts 201 are mounted in telescoping relationship to the frame of the jack stand, not specifically shown. The power unit rather than being equipped with a pair of lifting arms is then equipped with only a single lifting arm 210, which is inserted between the pair of vertical shafts 201 for engaging and raising the load-bearing seat 200.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A two-part jack system comprising, in combination: an extendible jack stand having a horizontal bottom plate, a horizontal top plate, a pair of vertically disposed telescoping members attached to corresponding ones of said plates, and ratchet means carried by said telescoping members for releasably locking said members in a selected position of longitudinal extension;

a power unit having wheel support means and adapted to be selectively moved towards or away from the vicinity of said jack stand, said power unit having expansible lifting means adapted to be inserted between said plates of said jack stand;

power means carried by said power unit for expanding or contracting said expansible lifting means to thereby raise or lower said top plate;

manually operated means carried by said power unit for controlling said power means; and manually operated means carried by said power unit for releasing said ratchet means when said top plate is to be lowered.

2. A two-part jack system as claimed in claim 1 which further includes alignment means on said power unit, and separate alignment means on said jack stand, said two alignment means cooperating for aligning said two units in a predetermined relative position; and means for releasably securing said two units together in said predetermined relative position.

3. A two-part jack system as claimed in claim 1 wherein said expansible lifting means includes a pair of latch arms adapted to be positioned upon said bottom plate on opposing sides of said telescoping members, and a pair of lifting arms adapted to engage the undersurface of said top plate on opposing sides of said telescoping members.

4. A two-part jack system as claimed in claim 3 wherein said power means includes a single hydraulic cylinder, and means for lifting said pair of lifting arms in unison in response to a driving force provided by said cylinder.

5. A two-part jack system as claimed in claim 2 wherein said releasable securing means cooperates directly with said alignment means in securing said two units together.

6. A two-part jack system as claimed in claim 5 which further includes coupling means cooperatively associated with both said alignment means and said releasable securing means, and coupling said ratchet means of said jack stand with said manually operated means carried by said power unit for releasing said ratchet means.

7. A two-part jack system as claimed in claim 2 wherein said releasable securing means cooperates directly with said alignment means in securing said two units together.

8. A two-part jack system as claimed in claim 7 which further includes coupling means cooperatively associated with both said alignment means and said releasable securing means, and coupling said ratchet means of said jack stand with said manually operated means carried by said power unit for releasing said ratchet means.

9. A two-part jack system as claimed in claim 2 where said expansible lifting means includes a pair of latch arms adapted to be positioned upon said bottom plate on opposing sides of said telescoping members, and a pair of lifting arms adapted to engage the undersurface of said top plate on opposing sides of said telescoping members.

10. A system of apparatus for jacking up and supporting a vehicle or structure, comprising, in combination:

a plurality of extendible jack stand units, each having a supporting base adapted to rest upon the ground, a load-bearing seat for engaging and lifting a load, telescoping vertical support members for supporting said seat in a raised position above said supporting base, and means for locking said telescoping members in any selected one of a series of such raised positions;

a power unit adapted to raise or lower a selected one of said jack stand units, said power unit having means for removably latching same to the selected jack stand unit, expansible means adapted to be inserted between said supporting base and said load-bearing seat of the jack stand unit, and power means for causing said expansible means to expand and thereby raise the load-bearing seat of the associated jack stand unit;

means controlled by said power unit and operable when said load-bearing seat is in a raised position for unlocking said telescoping members while concurrently allowing said expansible means to contract; and all of said jack stand units being identical, whereby said power unit may be used with different ones of them in sequence.

11. The system of apparatus claimed in claim 10 wherein said power unit has wheel support means and is adapted to be selectively moved toward or away from the vicinity of a selected one of said jack stand units.

12. The system of apparatus claimed in claim 10 wherein said power unit includes manually operable means for controlling said power means, and manually operable means for unlocking said telescoping members of the associated jack stand unit.

13. The system of apparatus claimed in claim 10 wherein said power unit includes alignment means, and which further includes separate alignment means on each of said jack stand units, the alignment means of said power unit and the selected jack stand unit cooperating for aligning said two units in a predetermined relative position; said latching means being operable to releasably secure said two unit together in said predetermined relative position.

14. Apparatus for jacking up and supporting a vehicle or structure, comprising, in combination:

an extendible jack stand having a supporting base adapted to rest upon the ground, a load-bearing seat for engaging and lifting a load, telescoping vertical support members attached to said supporting base and said seat, respectively, for supporting said seat, and means for locking said telescoping members in an extended position;

a mobile hydraulic power unit having supporting wheels, expansible means adapted to be removably inserted between said load-bearing seat and said supporting base, means for releasably latching said power unit to said jack stand when said expansible means is thus inserted, and power means for causing said expansible means to expand so as to raise said load-bearing seat; and manually operable control means on said power unit controlling the operation of said power means for raising said load-bearing seat, for selectively releasing said means for locking said telescoping members in an extended position, and for lowering said load-bearing seat after said locking means has been released.

15. Apparatus as claimed in claim 14 wherein said power unit has a handle and said manually operable control means are carried by said handle.

16. Apparatus as claimed in claim 14 wherein said power unit is adapted to transport said jack stand, to position said jack stand underneath a vehicle or structure, to selectively raise said load-bearing seat of said jack stand, to selectively release said locking means of said jack stand, to selectively lower said load-bearing seat of said jack stand, and to retrieve said jack stand when its work has been completed.

17. Apparatus as claimed in claim 16 wherein said power unit has a handle and said manually operable control means are carried by said handle.

18. A jacking system comprising an extendible jack stand adapted to rest upon the ground, a power unit selectively attachable to said jack stand for raising or lowering said jack stand, ratchet means on said jack stand for automatically maintaining said stand in a raised position, wheeled support means fixedly attached to said power unit, and manual control means carried by said power unit and coupled to said jack stand whenever said power unit is attached thereto for selectively releasing said ratchet means so as to permit said jack stand to be lowered.

19. A jacking system as claimed in claim 18 wherein said extendible jack stand includes first and second vertically telescoping members, one of said members carrying a pair of parallel plates which are spaced apart and each of which has a vertical series of teeth formed thereon;

the other of said telescoping members carrying a pair of pivotally supported tooth members adapted to engage the teeth of respective ones of said plates;

said manually controlled means of said power unit being operable for releasing both of said tooth members at the same time.

20. Apparatus for jacking up and supporting a vehicle or structure, comprising, in combination:

an extendible jack stand having a supporting base adapted to rest upon the ground, a load-bearing seat for engaging and lifting a load, telescoping vertical support members attached to said supporting base and said seat, respectively, for supporting said seat, and ratchet means for locking said telescoping members in an extended position;

a mobile hydraulic power unit having supporting wheels, expansible means adapted to be removably inserted between said load-bearing seat and said supporting base, means for releasably latching said power unit to said jack stand when said expansible means is thus inserted, and power means for causing said expansible means to expand so as to raise said load-bearing seat; and manually operable means on said power unit coupled to said jack stand for selectively releasing said ratchet means when said telescoping members are in an extended position, said manually operable means also controlling said power means for supporting said load-bearing seat in a downward movement after said ratchet means has been released.

*21. A two-part jack apparatus comprising, in combination:*

*a jack stand having a horizontal bottom plate, a horizontal top plate, a pair of vertically disposed telescoping members attached to corresponding ones of said plates, and ratchet means carried by said telescoping members for releasably locking said members in a selected position of longitudinal extension;*

*a power unit adapted to be selectively aligned with and releasably attached to said jack stand;*

*said power unit having expansible lifting means adapted to be inserted between said plates of said jack stand on opposite sides of said telescoping members; and*

*power means carried by said power unit for expanding or contracting said expansible lifting means to thereby raise or lower said top plate; characterized by the feature that said power unit includes alignment means, said jack stand having separate alignment means;*

*said two alignment means cooperating for aligning said two units in a predetermined relative position; and manually operated means carried by said power unit and remote from said power unit alignment means, for controlling said power means and for releasing said ratchet means when said top plate is to be lowered.*

*22. A two-part jack apparatus as claimed in claim 21 wherein said ratchet means includes spring means for automatically locking said telescoping members in an extended position.*

*23. A two-part jack apparatus as claimed in claim 21 or 22 which further includes spring latch means cooperating directly with said alignment means for releasably securing said two units together.*

*24. A two-part jack apparatus as claimed in claim 23 wherein said power unit includes a spaced pair of latch arms adapted to slide over said bottom plate of said jack stand on respective sides of said telescoping members, the forward inner ends of said latch arms having said power unit alignment means comprising curved surfaces adapted to align said two units as they are being brought together, said alignment means of said jack stand including a pair of protuberances on respective sides of said telescoping members, and said spring latch means comprising a pair of springs extending in parallel relationship to respective ones of said latch arms for releasably engaging respective ones of said protuberances.*

*25. A two-part jack apparatus as claimed in claim 23 wherein said expansible lifting means includes a pair of latch arms adapted to be positioned upon said bottom plate, and a pair of lifting arms adapted to engage the undersurface of said top plate.*

*26. A two-part jack apparatus as claimed in claim 25 wherein said latch arms and said lifting arms are part of a scissors mechanism.*

*27. A two-part jack apparatus as claimed in claim 25 wherein said power means includes a single hydraulic cylinder for actuating said scissors mechanism.*

*28. A two-part jack apparatus as claimed in claim 25 wherein one of said telescoping members of said jack stand is a hollow frame attached to said bottom plate and extending upwardly therefrom, and the other of said telescoping members is a vertical shaft attached to said top plate and extending downwardly within said hollow frame;*

*said jack stand also including a vertical series of ratchet teeth carried by said shaft, and a ratchet arm extending vertically upward inside said frame, said ratchet arm having a curved tooth on its upper end and being pivotally mounted near said tooth on the interior wall of said frame so that said tooth may move towards or away from said ratchet teeth.*

*29. A two-part jack apparatus as claimed in claim 28 wherein said hollow frame of said jack stand has an opening formed therein adjacent the lower end of said ratchet arm and at a fixed elevation above said bottom plate, whereby the horizontal movement of a ratchet release member through said opening may effect the unlocking of said ratchet arm.*

*30. A two-part jack apparatus as claimed in claim 29 wherein said ratchet release member is secured to the lower end of said ratchet arm.*

*31. A two-part jack apparatus as claimed in claim 30 wherein said jack stand includes two such series of ratchet teeth, two such ratchet arms, and said hollow frame has two such openings therein, one for each ratchet arm.*

*32. A two-part jack apparatus as claimed in claim 31 wherein said manually operated means for controlling said power means, when a lifting action is completed, locks said jack stand in place without any load demands on said power means.*

*33. A two-part jack apparatus as claimed in claim 31 wherein said power unit includes separate manually operable means for releasing said ratchet means.*

*34. A two-part jack apparatus as claimed in claim 33 wherein, said separate manually operable means includes cam means for providing a horizontal actuating force against a ratchet arm contained in said ratchet means, for selectively unlocking said telescoping members.*

*35. A two-part jack apparatus as claimed in claim 34 which includes at least two identical ones of said jack stands.*

*36. A two-part jack apparatus as claimed in claim 35 wherein said power unit is capable of transporting, positioning, raising, locking, unlocking, lowering, and withdrawing a jack stand.*

*37. A two-part jack apparatus as claimed in claim 36 wherein said power unit is supported on wheels.*

*38. A two-part jack system comprising, in combination: an extendible jack stand having a horizontal bottom plate, a horizontal top plate, a pair of vertically disposed telescoping members attached to corresponding ones of said plates, and ratchet means carried by said telescoping members for releasably locking said members in a selected position of longitudinal extension;*

*a power unit having support means, adapted to be selectively moved towards or away from the vicinity of said jack stand, said power unit having expansible lifting means adapted to be inserted between said plates of said jack stand;*

*power means carried by said power unit for expanding or contracting said expansible lifting means to thereby raise or lower said top plate;*

*manually operated means carried by said power unit for controlling said power means; and*

*manually operated means carried by said power unit for releasing said ratchet means when said top plate is to be lowered.*

*39. A two-part jack system as claimed in claim 38 which further includes alignment means on said power unit, and separate alignment means on said jack stand, said two alignment means cooperating for aligning said two units in a predetermined relative position; and*

*means for releasably securing said two units together in said predetermined relative position.*

*40. A two-part jack system as claimed in claim 38 wherein said expansible lifting means includes a pair of latch arms adapted to be positioned upon said bottom plate on opposing sides of said telescoping members, and a pair of lifting arms adapted to engage the undersurface of said top plate on opposing sides of said telescoping members.*

*41. A two-part jack system as claimed in claim 40 wherein said power means includes a single hydraulic cylinder, and means for lifting said pair of lifting arms in unison in response to a driving force provided by said cylinder.*

*42. A two-part jack system as claimed in claim 39 wherein said releasable securing means cooperates directly with said alignment means in securing said two units together.*

*43. A two-part jack system as claimed in claim 42 which further includes coupling means cooperatively associated with both said alignment means and said releasable securing means, and coupling said ratchet means of said jack stand with said manually operated means carried by said power unit for releasing said ratchet means.*

*44. A two-part jack system as claimed in claim 39 wherein said releasable securing means cooperates directly with said alignment means in securing said two units together.*

*45. A two-part jack system as claimed in claim 44 which further includes coupling means cooperatively associated with both said alignment means and said releasable securing means, and coupling said ratchet means of said jack stand with said manually operated means carried by said power unit for releasing said ratchet means.*

*46. A two-part jack system as claimed in claim 39 where said expansible lifting means includes a pair of latch arms adapted to be positioned upon said bottom plate on opposing sides of said telescoping members, and a pair of lifting arms adapted to engage the undersurface of said top plate on opposing sides of said telescoping members.*

*47. A system of apparatus for jacking up and supporting a vehicle or structure, comprising, in combination:*

*a plurality of extendible jack stand units, each having a supporting base adapted to rest upon the ground, a load-bearing seat for engaging and lifting a load, telescoping vertical support members for supporting said seat in a raised position above said supporting base, and means for locking said telescoping members in any selected one of a series of such raised positions;*

*a power unit adapted to raise or lower a selected one of said jack stand units, said power unit having means for aligning and removably latching same to the selected jack stand unit, expansible means adapted to be inserted between said supporting base and said load-bearing seat of the jack stand unit, and power means for causing said expansible means to expand and thereby raise the load-bearing seat of the associated jack stand unit;*

*means controlled by said power unit and operable when said load-bearing seat is in a raised position for unlocking said telescoping members while concurrently allowing said expansible means to contract; and*

*all of said jack stand units being identical, whereby said power unit may be used with different ones of them in sequence.*

*48. The system of apparatus claimed in claim 47 wherein said power unit has support means and is adapted to be selectively moved toward or away from the vicinity of a selected one of said jack stand units.*

*49. The system of apparatus claimed in claim 47 wherein said power unit includes manually operable means for controlling said power means, and manually operable means, remote from said power unit alignment means, for unlocking said telescoping members of the associated jack stand unit.*

*50. The system of apparatus claimed in claim 47 which further includes separate alignment means on each of said jack stand units, the alignment means of said power unit and the selected jack stand unit cooperating for aligning said two units in a predetermined relative position; said latching means being operable to releasably secure said two units together in said predetermined relative position.*

*51. Apparatus for jacking up and supporting a vehicle or structure, comprising, in combination:*

*an extendable jack stand having a supporting base adapted to rest upon the ground, a load-bearing seat for engaging and lifting a load, telescoping vertical support members attached to said supporting base and said seat, respectively, for supporting said seat, and means for locking said telescoping members in an extended position;*

*a mobile hydraulic power unit having supporting means, expansible means adapted to be removably inserted between said load-bearing seat and said supporting base, means for releasably latching said power unit to said jack stand when said expansible means is thus inserted, and power means for causing said expansible means to expand so as to raise said load-bearing seat; and*

*manually operable control means on said power unit controlling the operation of said power means for raising said load-bearing seat, for selectively releasing said means for locking said telescoping members in an extended position, and for lowering said load-bearing seat after said locking means has been released.*

*52. Apparatus as claimed in claim 51 wherein said power unit has a handle and said manually operable control means are carried by said handle.*

*53. Apparatus as claimed in claim 51 wherein said power unit is adapted to transport said jack stand, to position said jack stand underneath a vehicle or structure, to selectively raise said load-bearing seat of said jack stand, to selectively release said locking means of said jack stand, to selectively lower said load-bearing seat of said jack stand, and to retrieve said jack stand when its work has been completed.*

*54. Apparatus as claimed in claim 53 wherein said power unit has a handle and said manually operable control means are carried by said handle.*

*55. A jacking system comprising an extendible jack stand adapted to rest upon the ground, a power unit selectively attachable to said jack stand for raising or lowering said jack stand, ratchet means on said jack stand for automatically maintaining said stand in a raised position, support means fixedly attached to said power unit, and manual control means carried by said power unit and coupled to said jack stand whenever said power unit is attached thereto for selectively releasing said ratchet means so as to permit said jack stand to be lowered.*

*56. A jacking system as claimed in claim 55 wherein said extendible jack stand includes first and second vertically telescoping members, one of said members carrying a pair of parallel plates which are spaced apart and each of which has a vertical series of teeth formed thereon;*

*the other of said telescoping members carrying a pair of pivotally supported tooth members adapted to engage the teeth of respective ones of said plates;*

*said manually controlled means of said power unit being operable for releasing both of said tooth members at the same time.*

*57. Apparatus for jacking up and supporting a vehicle or structure, comprising, in combination:*

*an extendible jack stand having a supporting base adapted to rest upon the ground, a load-bearing seat for engaging and lifting a load, telescoping vertical support members attached to said supporting base and said seat, respectively, for supporting said seat, and ratchet means for locking said telescoping members in an extended position;*

*a mobile hydraulic power unit having supporting means, expansible means adapted to be removably inserted between said load-bearing seat and said supporting base, means for releasably latching said power unit to said jack stand when said expansible means is thus inserted, and power means for causing said expansible means to expand so as to raise said load-bearing seat; and*

*manually operable means on said power unit coupled to said jack stand for selectively releasing said ratchet means when said telescoping members are in an extended position, said manually operable means also controlling said power means for supporting said load-bearing seat in a downward movement after said ratchet means has been released.*

* * * * *